United States Patent [19]

Rasmussen

[11] 4,257,570

[45] Mar. 24, 1981

[54] TIE DOWN ASSEMBLY

[76] Inventor: Carl M. Rasmussen, 374 S. Stirling Dr., Fruit Heights, Utah 84037

[21] Appl. No.: 929,373

[22] Filed: Jul. 31, 1978

[51] Int. Cl.$^3$ ............................................. F16M 13/00
[52] U.S. Cl. ......................................... 248/503; 52/23
[58] Field of Search ............ 248/119 R, 222.3, 222.4, 248/223.1, 223.2, 225.1, 500, 503, 506, 507, 680, 681; 52/23; 24/230 TC

[56] References Cited

U.S. PATENT DOCUMENTS

| | | | |
|---|---|---|---|
| D. 233,014 | 10/1974 | Rasmussen et al. | D8/08 |
| D. 245,312 | 8/1977 | Rasmussen | D8/08 |
| 818,700 | 4/1906 | Morewood | 248/222.4 X |
| 1,646,216 | 10/1927 | Raines et al. | 24/230 TC X |
| 2,540,748 | 2/1951 | Hocher | 248/222.4 X |
| 2,830,457 | 4/1958 | Stewart | 52/23 X |
| 3,475,049 | 10/1969 | Overhulser | 296/23 MC |
| 3,503,647 | 3/1970 | Gostomski | 296/23 MC |
| 3,540,722 | 11/1970 | Weiler | 296/23 MC |
| 3,638,895 | 2/1972 | Henson | 296/23 MC X |
| 3,649,065 | 3/1972 | Stutz | 296/23 MC |
| 3,706,469 | 12/1972 | Covert | 296/23 MC |
| 3,744,840 | 7/1973 | Van Cleave | 296/23 MC |
| 3,781,057 | 12/1973 | Manuel | 296/23 MC |
| 3,782,775 | 1/1974 | Weiler et al. | 296/23 MC |
| 3,878,589 | 4/1975 | Schaefer | 248/225.1 X |

FOREIGN PATENT DOCUMENTS

| | | | |
|---|---|---|---|
| 1356372 | 2/1964 | France | 24/230 TC |
| 374580 | 2/1964 | Switzerland | 248/222.4 |

Primary Examiner—William H. Schultz
Attorney, Agent, or Firm—H. Ross Workman; Rick D. Nydegger; J. Winslow Young

[57] ABSTRACT

A tie down assembly for use in securing one object to another, such as a camper to a truck, the tie down assembly including a specially configured anchor member rigidly secured to a surface and having a head spaced from the surface by a diametrally reduced neck portion. A bracket member is provided with an interlock slot configured to permit removable attachment of the bracket member to the anchor member only when the interlock slot in the bracket member is oriented in a predetermined complementary way with respect to the special configuration of the camper anchor. Once attached to the anchor member, the bracket member may be freely rotated with respect to the anchor member but can be removed only when properly aligned. The bracket member is provided with a coupling means to receive a camper tie down turnbuckle or the like and because the bracket is rotatable upon the anchor, the bracket will automatically assume direct alignment with the turnbuckle and cannot become inadvertently detached from the anchor member while the tensioning force is exerted through the coupling to the bracket.

4 Claims, 8 Drawing Figures

TIE DOWN ASSEMBLY

BACKGROUND

1. Field of the Invention

The present invention relates to anchoring devices and more particularly to tie down devices for preventing relative movement of one object with respect to another.

2. The Prior Art

Tie down devices for securing campers to trucks are very well known in the recreation vehicle industry. The most common tie down devices are commonly referred to as "stake-pocket" or "straddle mount" tie downs, one representative type of which is illustrated in U.S. Pat. No. 3,781,057. Stake-pocket tie downs have been popular because they can be used to secure a camper to a truck bed without permanently defacing the truck. However, it is well known that stake-pocket and straddle-mount tie downs suffer from significant deficiencies which have caused serious concerns in terms of safety and reliability.

More particularly, stake-pocket and straddle-mount tie downs typically are inserted into stake pockets or secured on the sides of the truck bed and project laterally outward a considerable distance. An aperture at the end of the tie down receives a turnbuckle or similar device which is also attached to the truck camper. Thus, the truck camper is secured through a turnbuckle or the like to the distal end of the elongated stake-pocket tie down.

As wind or road motion acts to urge the camper away from the truck, significant torque and force moments are exerted through the turnbuckle to the distal end of the stake-pocket tie down. Because the stake-pocket tie down is secured to the turnbuckle at a distance substantially remote from the anchoring location on the truck, substantial leverage forces exist tending to cause the tie down to fail.

It would be a substantial improvement in the art to provide a tie down device which is aesthetically pleasing and yet self-orienting so as to prevent force moments which can cause the tie down to fail and the camper to thereby be inadvertently separated from the truck bed. Such an improvement is disclosed and claimed herein.

BRIEF SUMMARY AND OBJECTS OF THE INVENTION

The present invention comprises a tie down assembly, one portion of which is constructed to be aesthetically complementary to the truck design and to be permanently anchored to the truck. Another portion is constructed so as to be removably assembled with the first portion in a predetermined way and which is self-orienting to always be in alignment with the tensioning forces exerted by the camper or the like. Accordingly, the tie down device disclosed and claimed herein is exceptionally safe and dependable and is at the same time aesthetically pleasing.

It is a primary object of the present invention to provide improved structure and method for securing one object to another.

It is another object of the present invention to provide a tie down assembly including two selectively attachable components, one of which is rigidly secured to an object and the other of which is permitted to rotate to align the force moments exerted through the tie down.

Another valuable object of the present invention is to provide a tie down assembly comprising an anchor means and a bracket means attachable one with the other only by interconnecting the two in a predetermined manner, the anchor means and the bracket means resisting inadvertent detachment while preserving essentially uninhibited movement of the bracket means with respect to the anchor means.

It is another object of the present invention to provide a tie down assembly having an aesthetically pleasing anchor component and a selectively removable, self-aligning bracket component.

These and other objects and features of the present invention will become more fully apparent from the following description and appended claims taken in conjunction with the accompanying drawing.

DETAILED DESCRIPTION OF THE PREFERRED EMBODIMENTS

Reference is now made to the drawings wherein like parts are designated with like numerals throughout.

Figure 1:
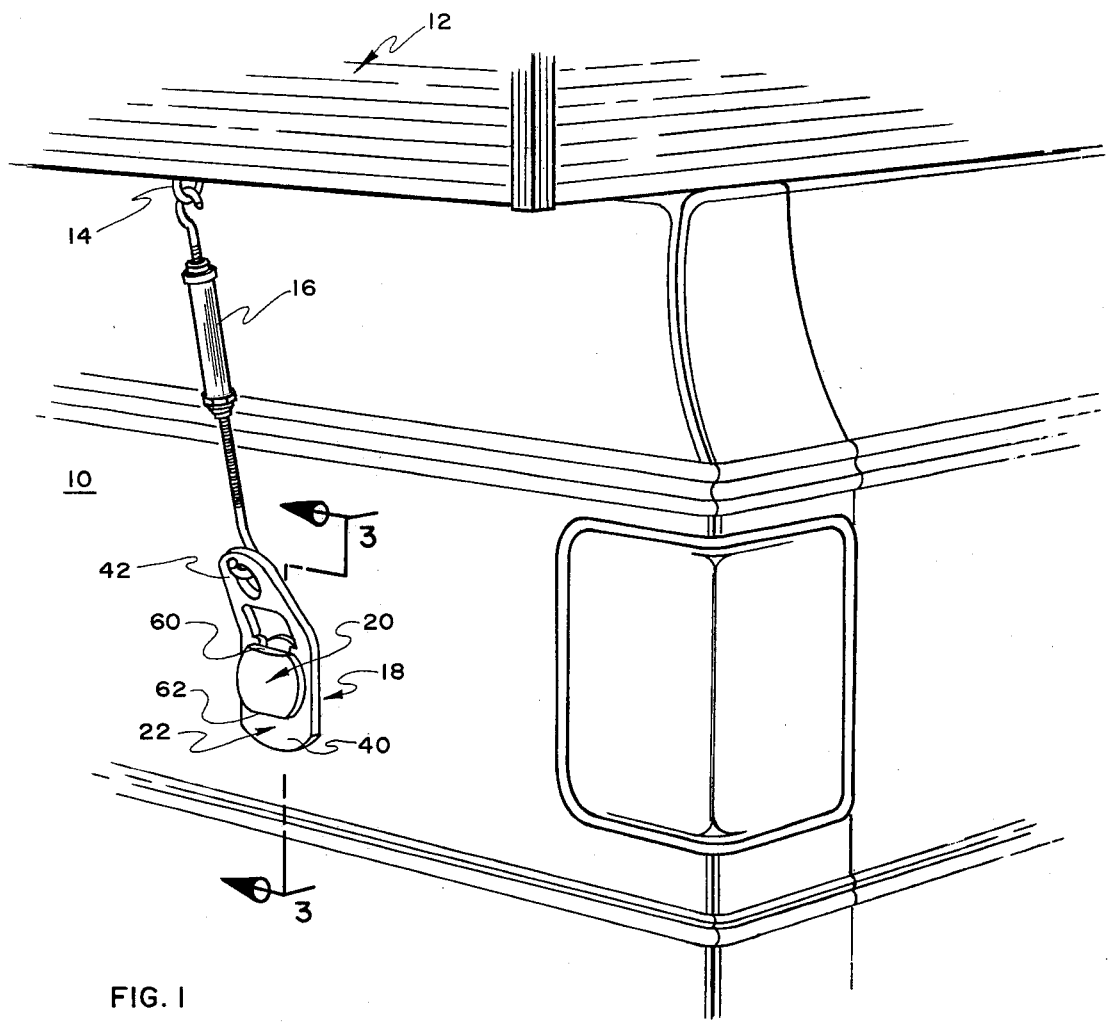
FIG. 1 is a perspective view of one presently preferred tie down assembly embodiment illustrated in the environment of a truck and camper.

Referring to FIG. 1, a truck bed schematically illustrated at 10 supports a truck camper 12 in a conventional manner. An eyelet 14 is mounted onto the camper 12 to serve as an attachment site. A turnbuckle 16 spans the distance between the eyelet 14 and the tie down assembly generally designated 18. Turnbuckle 16 is conventional and forms no part of the present invention. Clearly, any suitable turnbuckle could be used and, for that matter, any tensioning device including ropes, chains and other coupling structures could be used in connection with the tie down assembly 18 which will now be more fully described.

Figure 2:
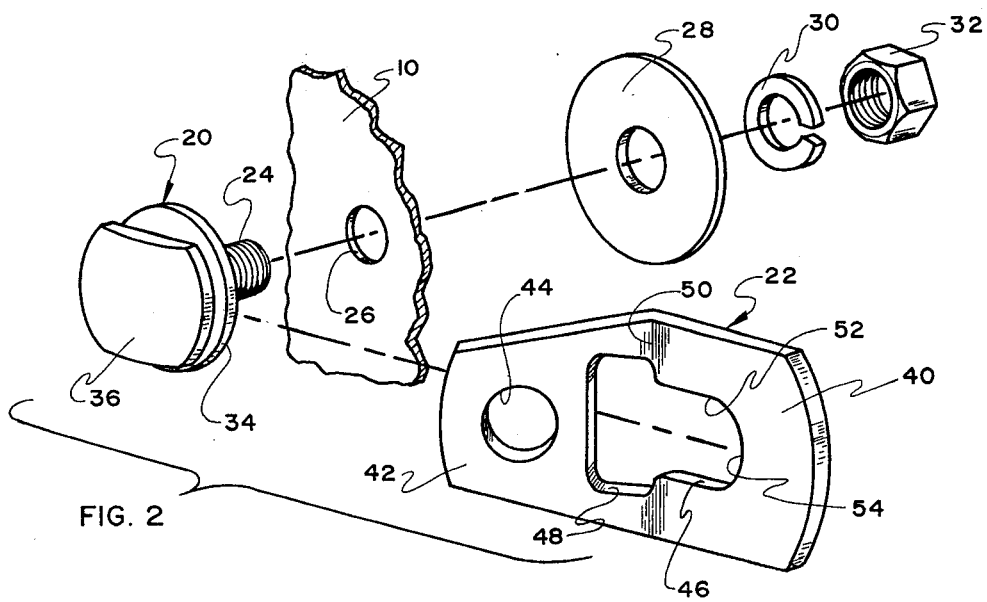
FIG. 2 is an exploded perspective illustration of the tie down assembly of FIG. 1.
Figure 8:
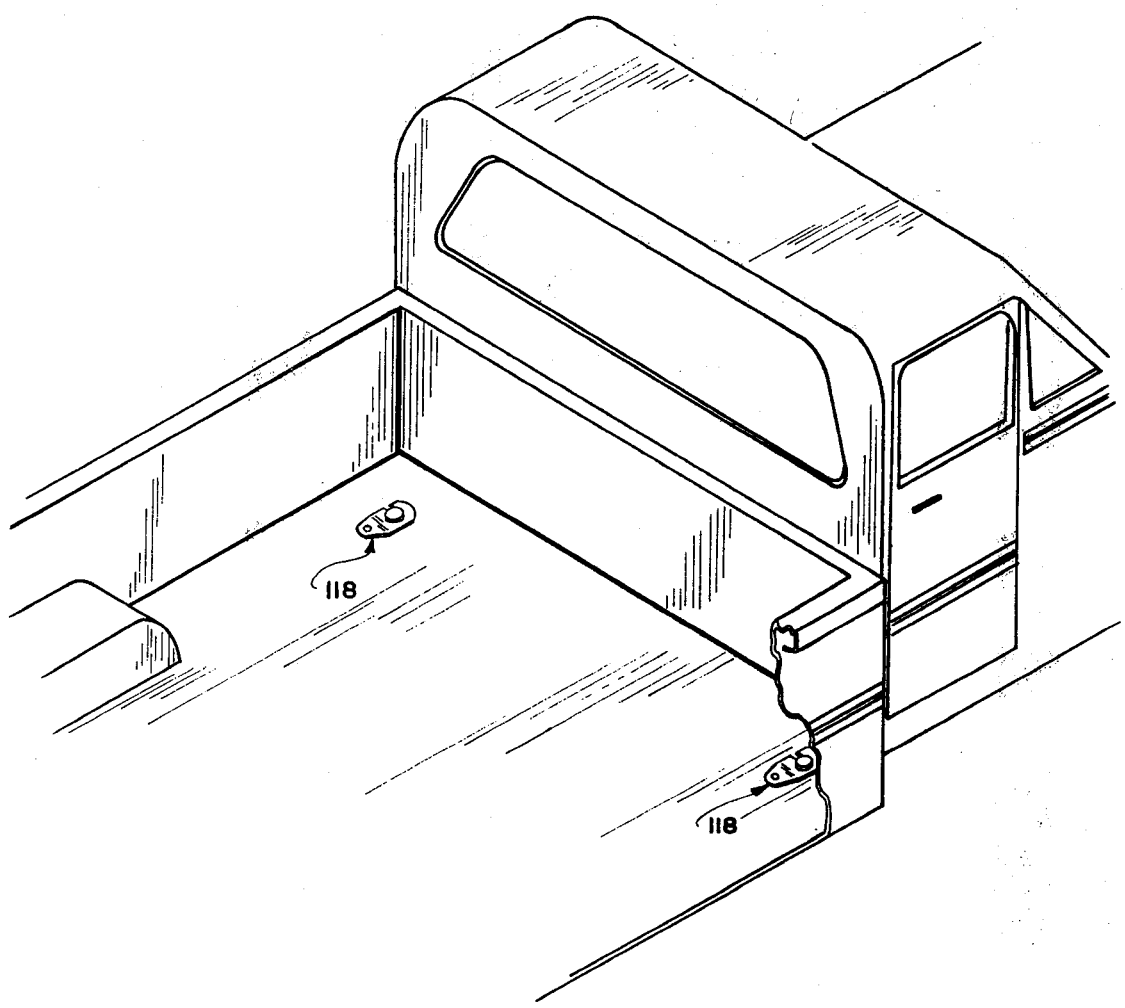
FIG. 8 is a perspective illustration of the tie down assembly mounted in the bed of a truck.

The tie down assembly 18 illustrated in FIG. 1 has two major components, i.e. an anchor component 20 and a bracket component 22. The anchor component illustrated in FIG. 1 can best be understood by reference to FIG. 2. Anchor component 20 comprises a bolt shank 24 which is externally threaded. The bolt shank 24 is adapted to project through an aperture 26 in the fabric of the truck body 10 and to mate with a disk washer 28, a lock washer 30 and a corresponding hex nut 32. Thus, the shank 24 of the anchor component 20 is rigidly and firmly secured to the truck body 10 at the location of the aperture 26. The aperture 26 can be located anywhere on the truck body such as on the rear fender wall illustrated in FIG. 1 or even on the floor of the truck bed as illustrated in FIG. 8 and described hereafter. Clearly, if desired, the anchor component 20 can be welded or otherwise mounted upon the truck body by conventional means.

The anchor component 20 has a diametrally enlarged collar 34 which limits the projection of the anchor component 20 into the truck 10. The anchor component 20 also has a diametrally enlarged head 36 which is separated from the collar 34 by a diametrally reduced neck 38.

In one preferred embodiment, the collar 34 and neck 38 are a unitary structure having a central aperture (not shown) through which the shank 24 is passed in assembly of the component 20. Alternatively, and equally desirable depending upon costs of construction, the head 36, neck 38 and collar 34 may be a single unitary piece with the shank 24 depending therefrom.

Figure 3:
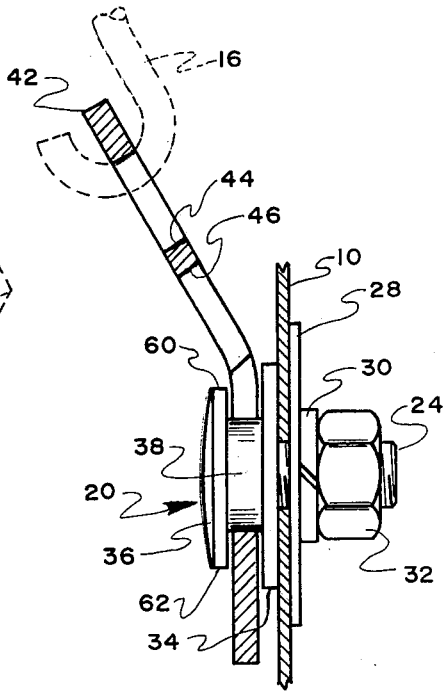
FIG. 3 is a cross section taken along lines 3—3 of FIG. 1.

Preferably, the head 36 and collar 34 are fabricated of metal which is chrome plated so that when the anchor component 20 is rigidly secured to the truck 10 as illustrated in FIGS. 1 and 3, the anchor component will have an aesthetically pleasing appearance and will appear as a chrome button complementing the exterior surface of the truck.

The bracket component 22 includes a base plate 40 and a coupling member 42. The coupling member 42 is contiguous with the base plate 40 and, in the illustrated embodiment, is angular with respect thereto to facilitate attachment of a turnbuckle 16 or the like as illustrated in FIG. 1. The coupling member 42 is preferably provided with an aperture 44 into which the turnbuckle 16 or other suitable securement structure is placed.

Figure 4:
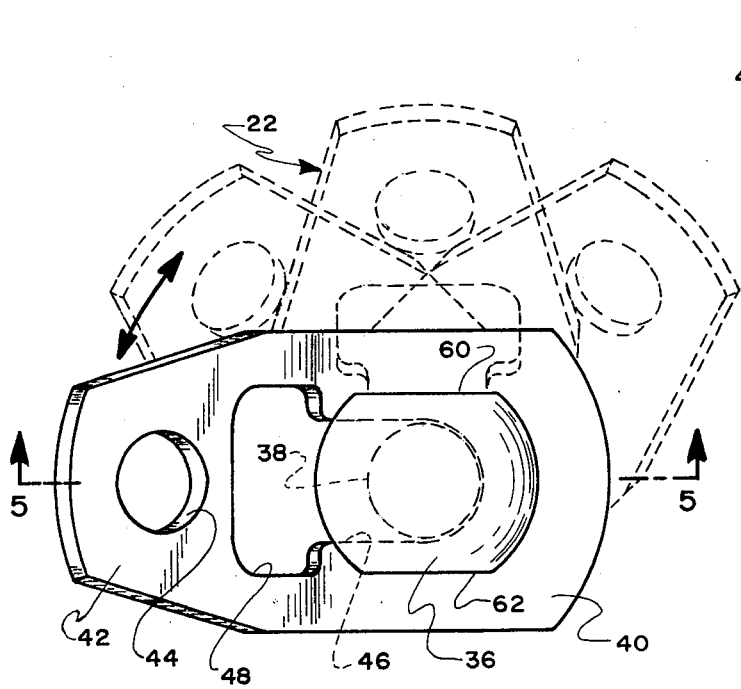
FIG. 4 is a top plan view of the tie down assembly of FIG. 1 with selected ones of an infinite variety of orientations illustrated in broken lines.

The bracket component 22 is further provided with interlock structure 46 defining an essentially T-shaped slot. The widest portion 48 of the interlock 46 is situated essentially central of the coupling member 42 above the bend 50. The narrower portion 52 of the interlock 46 is situated in the plate 40 and has a rounded configuration at its base 54. The base 54 traverses a radius which is slightly larger than the radius of the neck 38 (see FIGS. 3 and 4). Thus, when the bracket component 22 is assembled upon the anchor component 20 as illustrated in FIG. 4, the neck 38 will nest at the base 54 of the interlock 46 and at the same time permit uninhibited rotation about the longitudinal axis of the neck 38.

It is a highly desirable feature of the present invention to provide for assembly of the anchor component 20 and the bracket component 22 in such a way as to prevent inadvertent disassembly while at the same time permitting rotation of the bracket component 22 about the axis of the neck 38. In the illustrated embodiment, the anchor head 36 is provided with flattened parallel sides 60 and 62 symmetrically spaced from the neck 38. Each of the sides 60 and 62 is spaced from the other a distance which is only sightly smaller than the width of interlock portion 48. Accordingly, when the interlock portion 48 is precisely aligned with the flattened sides 60 and 62 as shown in the full line portions of FIG. 4, the bracket component 22 may be displaced in the direction of arrows 64 and 66 (FIG. 5) to remove the bracket component 22 from the anchor component 20.

In the illustrated FIG. 1 embodiment, it is presently preferred that the anchor component 20 be rigidly mounted to the truck 10 (see FIG. 1) so that the sides 60 and 62 are essentially horizontal. When a turnbuckle 16 is secured to the coupling member 42 of the bracket, and as tension is exerted through the turnbuckle 16, the neck 38 will be nested tightly in the base 54 of the bracket 22. Moreover, as shown in FIG. 4, the bracket component 22 automatically aligns with the force exerted through the turnbuckle on the anchor component 20. Thus, lever forces and torque which tend to damage the tie down or truck body are avoided. In this respect, the eyelet 14 can be located at any convenient location along the camper 12 and, when the turnbuckle 16 exerts a tensioning force through the bracket 22, the bracket 22 will automatically align itself with the tensioning force through the turnbuckle. The bracket component 22 is immediately adjacent the coupling site at the truck bed 10, thus minimizing, if not eliminating, the leverage movement at the anchor component 20.

Figure 5:
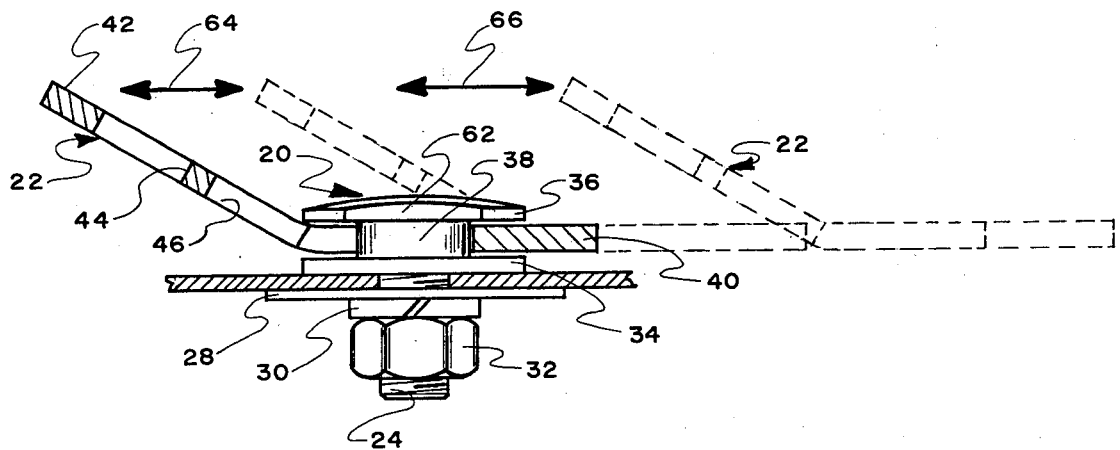
FIG. 5 is a cross section taken along lines 5—5 of FIG. 4.

Moreover, when the turnbuckle is removed and tensioning forces through the bracket 22 eliminated, the bracket 22 will not inadvertently disengage from the anchor component 20. Note, for example, as illustrated in FIG. 4 the bracket component 22 can only be removed by rotating the bracket until the wide portion 48 of the interlock 46 is aligned with the linear sides 60 and 62. Because the bracket component 22 is preferably formed of metal, and because the coupling member 44 is eccentric with respect to the axis of rotation of the bracket component about the anchor component 20, the bracket component will tend to rotate in a downward direction but certainly cannot inadvertently pause in the FIG. 4 position. Furthermore, even if such inadvertent positioning were obtained, a translation motion in the direction of arrows 64 and 65 must occur at precisely the same moment that alignment occurs. Clearly, the bracket component can be removed only by following the intentional predetermined procedures. Thus, the bracket component 22 may be left assembled with the anchor component 20 without detachment or, alternatively, the bracket component 22 may be intentionally detached from the anchor component by aligning the interlock 46 with the linear sides 60 and 62 of the head 36 and displacing the bracket component away from the anchor component 20 as illustrated in FIG. 5.

Figure 6:
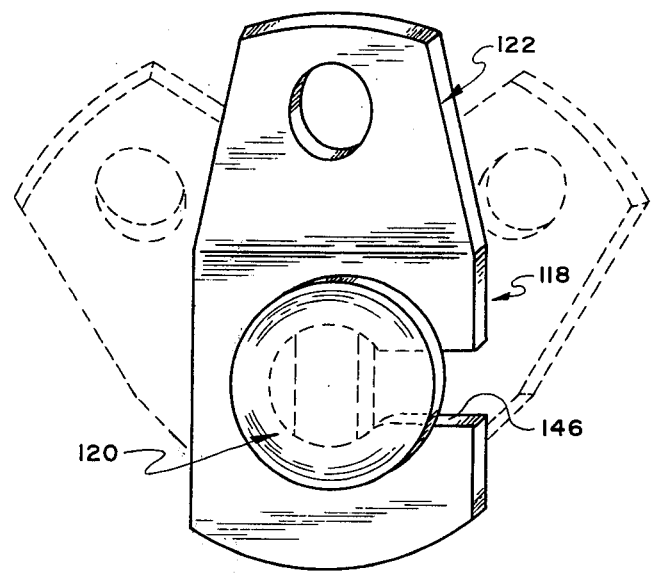
FIG. 6 is a perspective illustration of another presently preferred tie down assembly embodiment, selected ones of a variety of bracket orientations being illustrated in broken lines.
Figure 7:
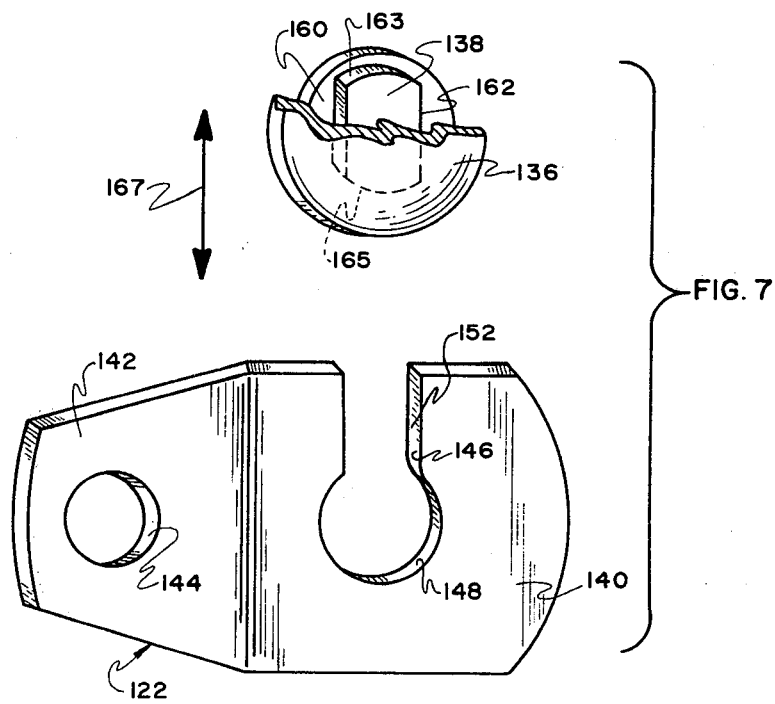
FIG. 7 is an exploded perspective of the tie down of FIG. 6, portions of which have been broken away to reveal underlying structure.

Reference is now made to FIGS. 6 and 7 illustrating another presently preferred embodiment generally designated 118 of the tie down assembly embodying the present invention. The tie down assembly 118 includes an anchor component 120 and a bracket component 122. The structure and operation of the tie down assembly 118 is substantially similar to the embodiment 18 and described in FIGS. 1-5, above. The tie down assembly 118 differs from the tie down assembly embodiment described above, primarily in the configuration of the interlock 146. Interlock 146 comprises a keyway having a reduced portion 152 and an essentially annular diametrally enlarged portion 148. The diametrally enlarged portion 148 is essentially central of the base plate 140 and in general alignment with the aperture 144 in the coupling member 142. The anchor component 120 comprises a generally annular head 136 and a diametrally reduced neck 138. The neck 138 has opposing, essentially parallel flat sides 160 and 162. The ends 163 and 165 of the neck 138 are rounded and have a radius which is substantially the same or slightly less than the radius of the base 148 of interlock 146. The bracket component 122 is attached to the anchor component 120 by aligning the narrow portion 152 of interlock 146 with the parallel flattened sides 160 and 162 of the neck 138. After alignment has been effected, the bracket 122 is displaced in the direction of arrow 167 until the neck portion 138 is nested adjacent the base 148. Thereafter, the bracket 122 is rotated about the longitudinal axis of the neck 138 to a suitable position such as any of the 5 positions illustrated in FIG. 6.

While the bracket embodiment illustrated and described herein has a primary intended use for attaching campers to truck beds, the tie down assemblies have also been found to be highly effective in securing motorcycles, snowmobiles and other related equipment within a truck or van. For this purpose, the anchor components 20 or 120 are anchored in the floor of the truck bed or van (see FIG. 8) and the bracket components 22 or 122 suitably attached for tie down purposes.

When desired, after use, the tie down bracket components 22 and 122 are removable leaving only the chromed anchor button 20 or 120 visually observable. Alternatively, for convenience, the bracket component 22 or 122 may be left attached to the corresponding anchor components with little risk of inadvertent detachment of the bracket components. Moreover, when the bracket components are tensioned with turnbuckles or other securement devices, the bracket components will automatically orient themselves into direct alignment with the tensioning force thereby minimizing the risk of compounding lever forces which, in turn, risk failure of the tie down and damage to the truck or vehicle.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A tie down assembly comprising in combination:
    bracket means comprising a coupling portion, a base portion and an interlock means, the coupling portion being joined to the base portion at a bend forming an obtuse angle, the interlock means comprising an access port formed in the coupling portion and an elongated opening formed in the base portion, the elongated opening being joined at a first end to the access opening at said bend and terminating at a second end in a rotation surface, the elongated opening having a first pair of parallel longitudinal surfaces residing within a first pair of reference planes, the access port having a second pair of parallel longitudinal surfaces residing within a second pair of reference planes, the transverse dimension of the access port being larger than that of the corresponding dimension of the elongated opening; and
    anchor means comprising a diametrally enlarged flanged head, a diametrally reduced neck and means for mounting the anchor means rigidly to a surface such that the flanged head is spaced from the surface a distance sufficient to allow the thickness of the bracket means to pass therebetween and a portion of the neck interposed therebetween, the flanged head configurated to present a first dimension slightly smaller, and at least one other dimension larger, than the distance between the second pair of reference planes, the neck being slightly smaller in diameter than the distance between the first pair of reference planes whereby the anchor means and the bracket means may be selectively engaged and disengaged by rotating the bracket means until the first pair of reference planes are aligned with the neck and the second pair of reference planes are aligned with the first dimension of the flanged head and by simple lateral movement of the aligned bracket means in a single plane, and whereby the bracket means may be rotated about the anchor means without inadvertent disengagement thereof after engagement is accomplished.

2. A tie down assembly as defined in claim 1 wherein said means for spacing said flanged head from said surface comprises a collar secured to the neck with a portion of the neck interposed between the flanged head and the collar, the collar being spaced from the flanged head a distance just larger than the thickness of the bracket means.

3. A tie down assembly as defined in claim 2 wherein said coupling portion is eccentric with respect to the axis of rotation of the bracket means about the anchor means and the alignment for disengagement is along the horizontal whereby, upon removal of a restraining force, the bracket means may rotate freely to a downward directed rest position without inadvertent disengagement.

4. A tie down assembly for attachment to a turnbuckle, said tie down assembly comprising in combination:
    anchor means comprising an enlarged head having a dimension which is smaller in the generally vertical plane than in the generally horizontal plane; and
    bracket means comprising a base portion and a coupling portion, the base portion being joined to the coupling portion at an obtuse angle and having a slotted interlock formed in the base portion and sized to receive the neck of the anchor means in movable relation, the slotted interlock communicating with an enlarged access opening in the coupling portion at its juncture with the base, said access opening admitting the enlarged head of the anchor means only by planar translation movement of the bracket means in the generally horizontal direction, and said coupling portion having an aperture positioned above said access opening such that attachment of said turnbuckle to said aperture will anchor the enlarged head of said anchor means within said slotted interlock of said base portion.

* * * * *